(12) United States Patent
Ulschmid (10) Patent No.: US 6,684,974 B1
(45) Date of Patent: Feb. 3, 2004

(54) FOUR-WHEEL STEERING SYSTEM FOR UTILITY VEHICLE

(75) Inventor: Timothy Gerard Ulschmid, Grafton, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/201,885

(22) Filed: Jul. 24, 2002

(51) Int. Cl.[7] .................................................. B62D 5/06
(52) U.S. Cl. ...................................... 180/414; 280/91.1
(58) Field of Search ................................ 180/408, 414, 180/415, 416; 280/91.1

(56) References Cited

U.S. PATENT DOCUMENTS

| | | | | |
|---|---|---|---|---|
| 3,596,730 A | * | 8/1971 | Cecce | 180/236 |
| 3,796,165 A | * | 3/1974 | Goode | 104/247 |
| 4,441,735 A | | 4/1984 | Hutchison et al. | |
| 4,977,733 A | | 12/1990 | Samejima et al. | |
| 5,080,185 A | * | 1/1992 | Kondo et al. | 180/415 |
| 5,174,595 A | | 12/1992 | Snipes | |
| 5,259,475 A | * | 11/1993 | Butler | 180/415 |
| 5,288,091 A | | 2/1994 | Deschamps | |
| 5,346,030 A | * | 9/1994 | Ohmura et al. | 180/412 |
| 6,267,198 B1 | * | 7/2001 | Hurlburt et al. | 180/414 |

* cited by examiner

Primary Examiner—Kevin Hurley
(74) Attorney, Agent, or Firm—Polit & Erickson, LLC (57) ABSTRACT

A four-wheel steering system includes a frame that carries an axle that rotationally mounts a pair of front wheels via a pair of front pivotal wheel support assemblies. For steering, the front pivotal wheel assemblies are pivotal with respect to the axle. The frame also carries a pair of rear wheels that are rotationally mounted to the frame via a pair of rear pivotal wheel support assemblies. For steering, the rear pivotal wheel assemblies are pivotal with respect to the frame about vertical axes. The front pivotal wheel support assemblies are connected together by a front axle tie rod. Steering by an operator causes expansion or contraction of a hydraulic cylinder arranged between one front pivotal wheel support assembly and the axle, causing selective pivoting of both front pivotal wheel support assemblies. A linkage assembly is operatively connected between one of the front pivotal wheel assemblies and the rear pivotal wheel support assemblies to transform pivoting motion of the front pivotal wheel support assemblies to pivoting motion of the rear pivotal wheel support assemblies in a direction opposite to the pivoting motion of the front pivotal wheel support assemblies.

17 Claims, 6 Drawing Sheets

FOUR-WHEEL STEERING SYSTEM FOR UTILITY VEHICLE

TECHNICAL FIELD OF THE INVENTION

The invention relates to vehicles heading four-wheel steering. Particularly, the invention relates to lawn and garden tractors having four-wheel steering.

BACKGROUND OF THE INVENTION

It is known to provide lawn and garden tractors with four steerable wheels to thereby decrease the tractor's minimum turning radius. One such four-wheel steering system is described in U.S. Pat. No. 5,174,595. This patent describes a tractor that has a frame and front and rear pairs of wheels for supporting the frame. The front and rear pairs of wheels are pivoted to steer the tractor. Front and rear center-pivot members are pivotally carried by the frame at respective points located proximate the centerline of the tractor.

Each front tie rod of a pair of front tie rods extends respectively between the front center-pivot member and the front wheels for pivoting the front wheels as the front center-pivot member pivots. Each rear tie rod of a pair of rear tie rods extends respectively between a rear center-pivot member and the rear wheels for pivoting the rear wheels as the rear center-pivot member pivots. A linkage assembly operatively couples the front and rear center-pivot members for transmitting pivotal motion therebetween.

The linkage assembly includes a first rod member coupled with the front center-pivot member. A first swing member is swingably carried by the frame and is coupled with the first rod member for swinging about a vertical axis as the front center-pivot member pivots. A second rod member couples the first swing member with a second swing member. The second swing member is carried by the frame for pivotal motion about a generally horizontal axis. A third rod member is coupled between the second swing member and the rear center-pivot member. The front portion of the second rod is restricted from shifting vertically, since the first swing member pivots about a vertical axis.

This four-wheel steering design is relatively costly to manufacture. Furthermore, the use of a front center-pivot member can restrict the available under-carriage space for use by a mower deck or traction components of the tractor. The present inventor has recognized that there is a need for a less costly, less complicated, and less bulky, four-wheel steering system for a utility vehicle, particularly for a lawn and garden tractor.

SUMMARY OF THE INVENTION

The invention provides a four-wheel steering system for a utility vehicle that includes a frame; a pair of front wheels rotationally mounted with respect to the frame via a pair of front pivotal wheel support assemblies to be pivotal about respective turning axes for steering; a pair of rear wheels rotationally mounted with respect to the frame via a pair of rear pivotal wheel support assemblies to be pivotal about respective turning axes for steering; a hydraulic cylinder connected at one end thereof with respect to the frame and at an opposite end thereof with respect to one of the front pivotal wheel support assemblies at a radial distance from its respective turning axis, and operable to expand and contract to pivot the one front pivotal wheel support assembly; and a linkage assembly operatively connected between one of the front pivotal wheel support assemblies and the rear pivotal wheel support assemblies to transform pivoting motion of the front pivotal wheel support assembly to pivoting motion of the rear pivotal wheel support assemblies in an opposite rotational direction to the pivoting motion of the front pivotal wheel support assembly.

One exemplary embodiment of the four-wheel steering system of the invention is described herein. A frame carries a pair of front wheels that are rotationally mounted to the frame via an axle and a pair of front pivotal wheel support assemblies. For steering, the front pivotal wheel assemblies are pivotal with respect to the axle about respective turning axes. The frame also carries a pair of rear wheels that are rotationally mounted to the frame via a pair of rear pivotal wheel support assemblies. For steering, the rear pivotal wheel assemblies are pivotal with respect to the frame about respective turning axes.

Each of the front pivotal wheel support assemblies includes a front steering arm extending radially from the turning axis of its respective front pivotal wheel support assembly. A front axle tie rod is pivotally connected at opposite ends thereof to each of the front steering arms at a radial distance from each respective turning axis of the front pivotal wheel support assemblies. The tie rod causes the front steering arms to pivot together. A hydraulic cylinder is connected at opposite ends thereof to the axle and to one front steering arm at a radial distance from its pivot axis, and is operable by steering input from an operator to expand or contract to selectively pivot the front steering arms.

Each of the rear pivotal wheel support assemblies includes a rear steering arm extending radially from the turning axis of its respective rear pivotal wheel support assembly. A linkage assembly is operatively connected between one of the front steering arms and the rear steering arms to transform pivoting motion of the front steering arm to pivoting motion of the rear steering arms in an opposite rotational direction to the pivoting motion of the front steering arm.

The linkage assembly includes: a front intermediate pivot, a front intermediate link, a longitudinal rod, a lever, a rear intermediate link, a rear pivot member, and first and second tie rods. The front intermediate pivot is mounted for pivoting with respect to the frame. The front intermediate link is pivotally connected at opposite ends thereof to the one front steering arm and to a pivot joint on the front intermediate pivot. The longitudinal rod is pivotally connected at a first end to the front intermediate pivot. The lever is pivotally mounted to the frame, and the rod is pivotally connected to the lever. The rear pivot member is pivotally mounted to the frame. The rear intermediate link is pivotally connected between the lever and the rear pivot member. The first and second rear tie rods are each connected at respective first ends to the rear pivot member and at respective second ends to respective rear steering arms.

The inventive four-wheel steering eliminates the need for a front center-pivot which reduces the cost, bulk and complexity of the four-wheel steering system.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
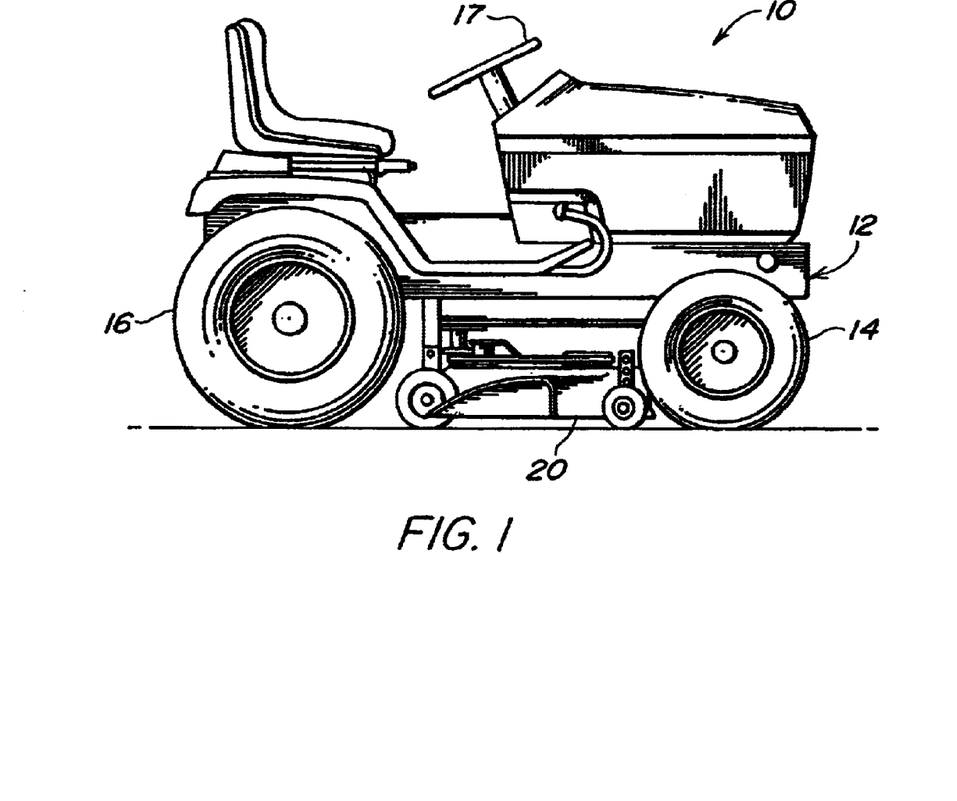
FIG. 1 is an elevational view of a lawn and garden tractor incorporating four-wheel steering of the invention.

An exemplary embodiment of the four-wheel steering system of the invention is described herein. FIG. 1 illustrates a utility vehicle 10, such as a lawn and garden tractor, which includes a frame 12 that carries a pair of front wheels 14 and a pair of rear wheels 16. Each of the wheels 14, 16 typically includes a metallic wheel and a surrounding a rubber tire. A steering wheel 17 is located in the operator's station and can be turned by the operator to affect pivoting of the wheels 14 and 16 for steering the vehicle 10. A mower deck 20 within which a plate rotates to cut vegetation is suspended between the vehicle 10 between the front and rear wheels 14 and 16.

Figure 2:
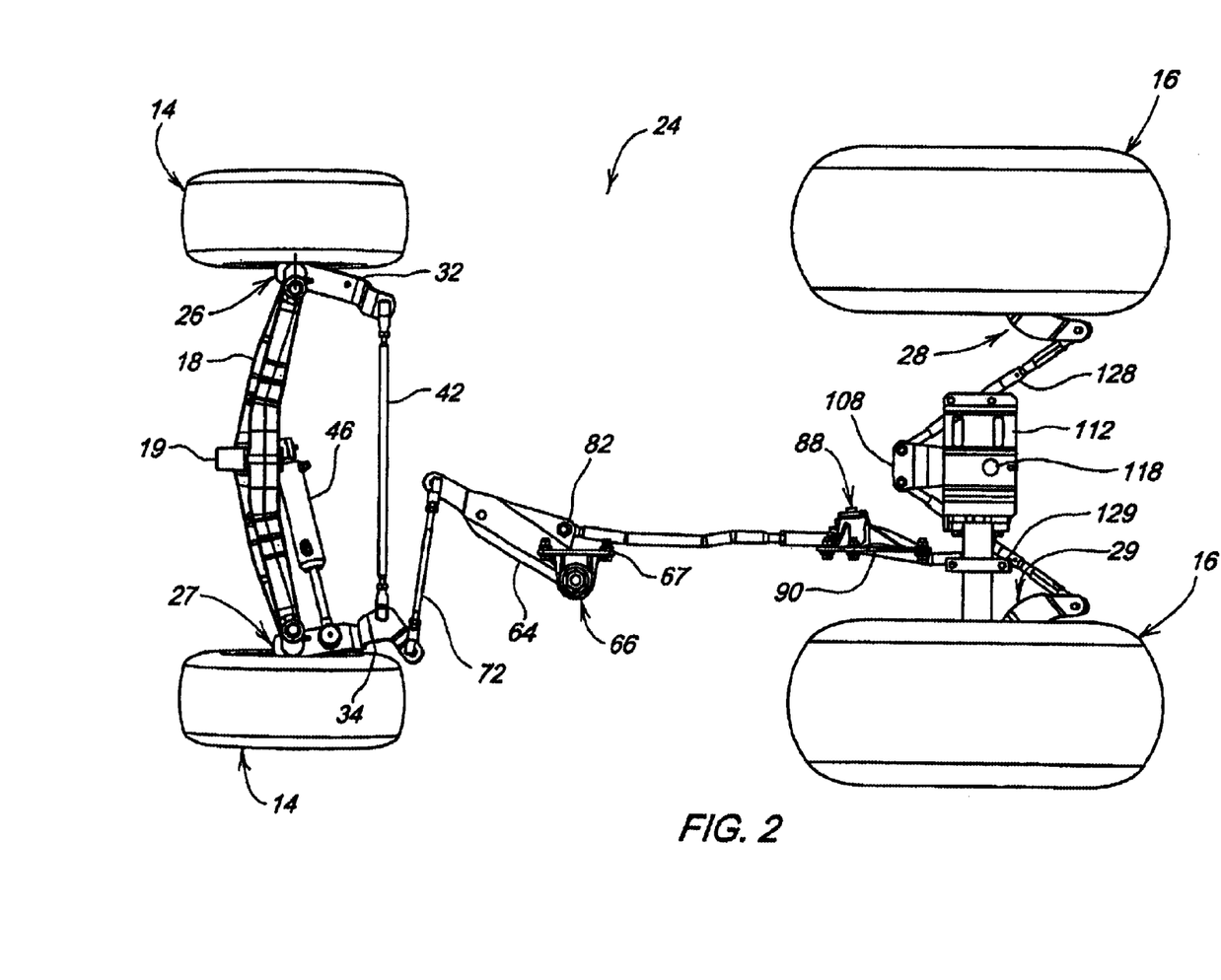
FIG. 2 is a plan view of a four-wheel steering system of the present invention, shown in isolation from remaining portions of the tractor.
Figure 3:
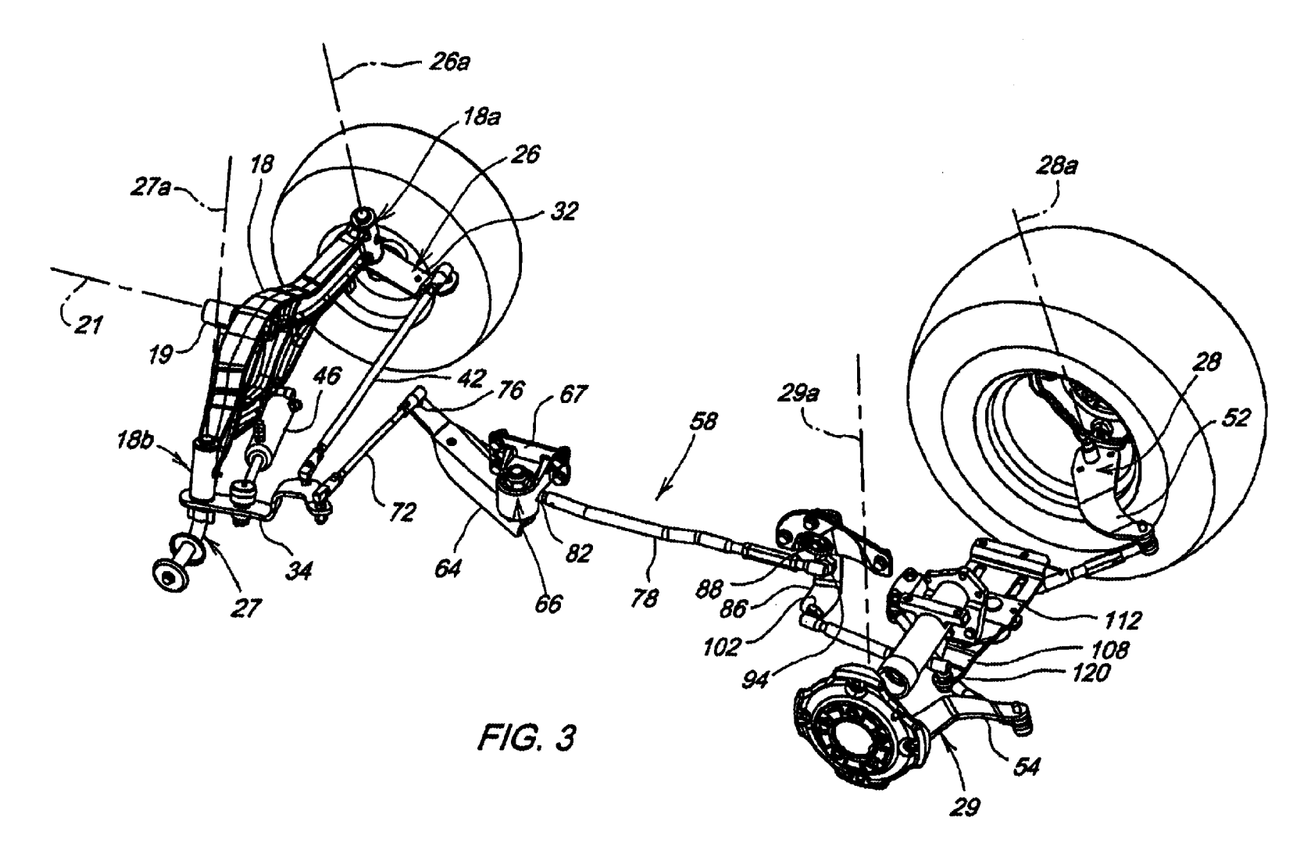
FIG. 3 is a fragmentary, perspective view of the four-wheel steering system shown in FIG. 2.

FIGS. 2 and 3 illustrate the steering system 24 isolated from remaining portions of the vehicle 10. The front wheels 14 are mounted to the frame 12 via an axle 18 and a pair of front pivotal wheel support assemblies 26, 27, respectively. The wheels 14 are mounted to rotate on the assemblies 26, 27. The axle 18 is pivotally connected to the frame 12 at a connection 19 to pivot about a horizontal axis 21. For steering, the front pivotal wheel support assemblies are pivotally connected to the axle 18 at journals 18a, 18b respectively, to pivot about turning axes 26a, 27a respectively (see FIG. 3).

The rear wheels 16 are mounted to the frame 12 via a pair of rear pivotal wheel support assemblies 28, 29, respectively. The wheels 16 rotate on the assemblies 28, 29. For steering, the rear pivotal wheel assemblies are pivotal with respect to the frame about turning axes 28a, 29a respectively (see FIG. 3).

Each of the front pivotal wheel support assemblies 26, 27 includes a front steering arm 32, 34 respectively, each extending radially from the turning axis of its respective front pivotal wheel support assembly 26, 27. A front axle tie rod 42 is pivotally connected at opposite ends thereof to each of the front steering arms 32, 34 at a radial distance from each respective turning axis 26a, 27a of the front pivotal wheel support assemblies. The tie rod 42 causes the front steering arms 32, 34 to pivot together. A hydraulic cylinder 46 is connected at opposite ends thereof to the axle 18 and to one front steering arm 34 at a radial distance from its turning axis. The hydraulic cylinder 46 is operatively connected to steering wheel 17 and is responsive to turning of the steering wheel 17 to expand or contract to selectively pivot the front steering arms 32, 34.

Each of the rear pivotal wheel support assemblies 28, 29 includes a rear steering arm 52, 54 extending radially from the turning axis 28a, 29a of its respective rear pivotal wheel support assembly 28, 29. A linkage assembly 58 is operatively connected between one of the front steering arms 34 and the rear steering arms 52, 54 to transform pivoting motion of the front steering arm 34 to pivoting motion of the rear steering arms 52, 54 in an opposite rotary direction to the pivoting motion of the front steering arm 34. The hydraulic cylinder 46 and the linkage assembly 58 can both be connected to the same front steering arm.

The linkage assembly 58 can include a front intermediate pivot or crank 64 connected for rotation about a first pivot joint 66 to the frame 12 via a bracket 67. The front intermediate pivot 64 swings in substantially a horizontal plane about the pivot joint 66. A front intermediate link 72 is pivotally connected at opposite ends thereof to the one front steering arm 34 and to a second pivot joint 76 on the front intermediate pivot 64 at a distance from the first pivot joint 66. The one front steering arm 34 that is connected to the front intermediate link 72 extends radially from its respective turning axis 27a by a length greater than a length of a respective other front steering arm 32.

Figure 6:
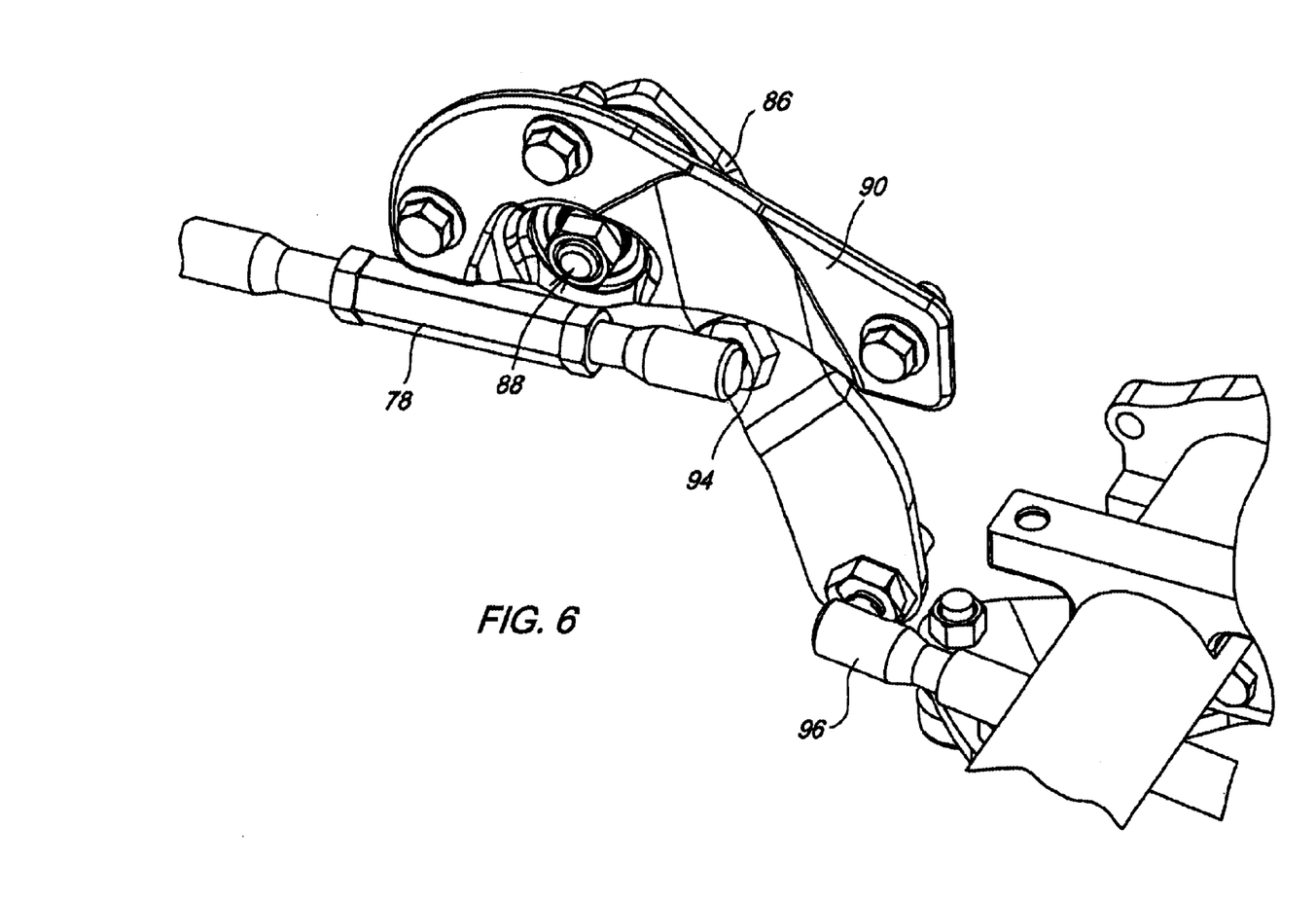
FIG. 6 is an enlarged, fragmentary perspective view taken from FIG. 5.

A longitudinal rod 78 is pivotally connected at a first end to the front intermediate pivot 64 at a third pivot joint 82 located at a distance from both the first and second pivot joints. A motion-amplifying lever 86, shown enlarged in FIG. 6, is pivotally mounted at a fourth pivot joint 88 to the frame 12, via a bracket 90. The lever swings in substantially a vertical plane. The rod 78 is pivotally connected to the lever 86 at a fifth pivot joint 94 located at a distance from the fourth pivot joint 88.

A rear intermediate link 96 is pivotally connected at a first end thereof to the lever 86 at a sixth pivot joint 102 that is located on a side of the fifth pivot joint 94 opposite the fourth pivot joint 88. A rear center-pivot member 108 is pivotally mounted to the frame 12 via a frame bracket 112 at a seventh pivot joint 118. The rear intermediate link 96 is pivotally connected at a second end thereof to a moment arm 108a of the rear center-pivot member 108 at an eighth pivot joint 120 that is spaced from the seventh pivot joint 118. First and second rear tie rods 128, 129 are each connected at respective first ends to the rear center-pivot member 108 and at its respective second end to a respective rear steering arm 28, 29.

Figure 7:
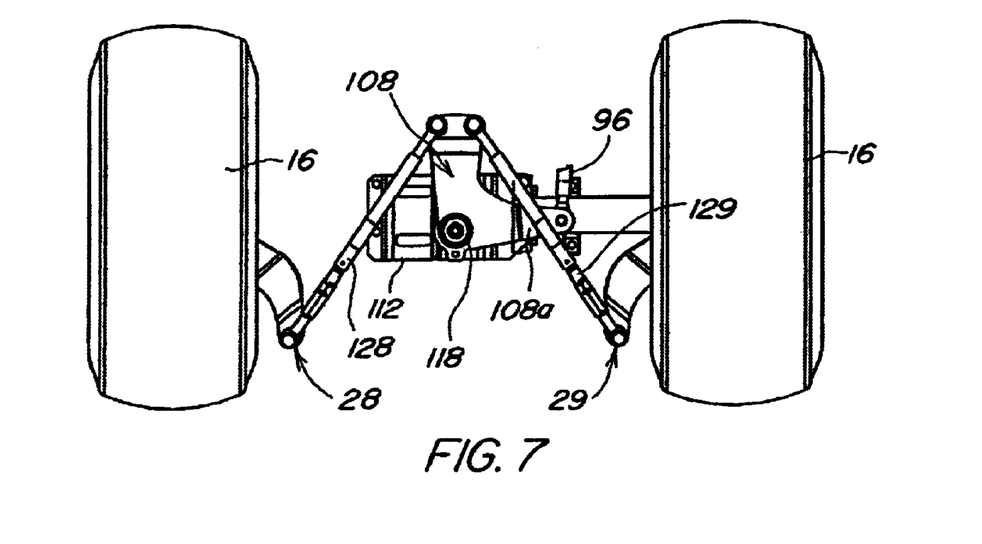
FIG. 7 is a fragmentary, bottom view of a rear portion of the four-wheel steering system of FIG. 2.

FIG. 7 illustrates the connections of the rear center-pivot member 108, the rear intermediate plate 96, and the rear tie rods 128, 129, from a bottom view.

To ensure smooth, reduced friction steering operation, the pivot joints can be ball-type joints. Also, the tie rods, the longitudinal rod and the links can have threaded length-adjusting fixtures along part of their lengths to precisely set the various lengths to achieve an overall precise wheel alignment.

Figure 4:
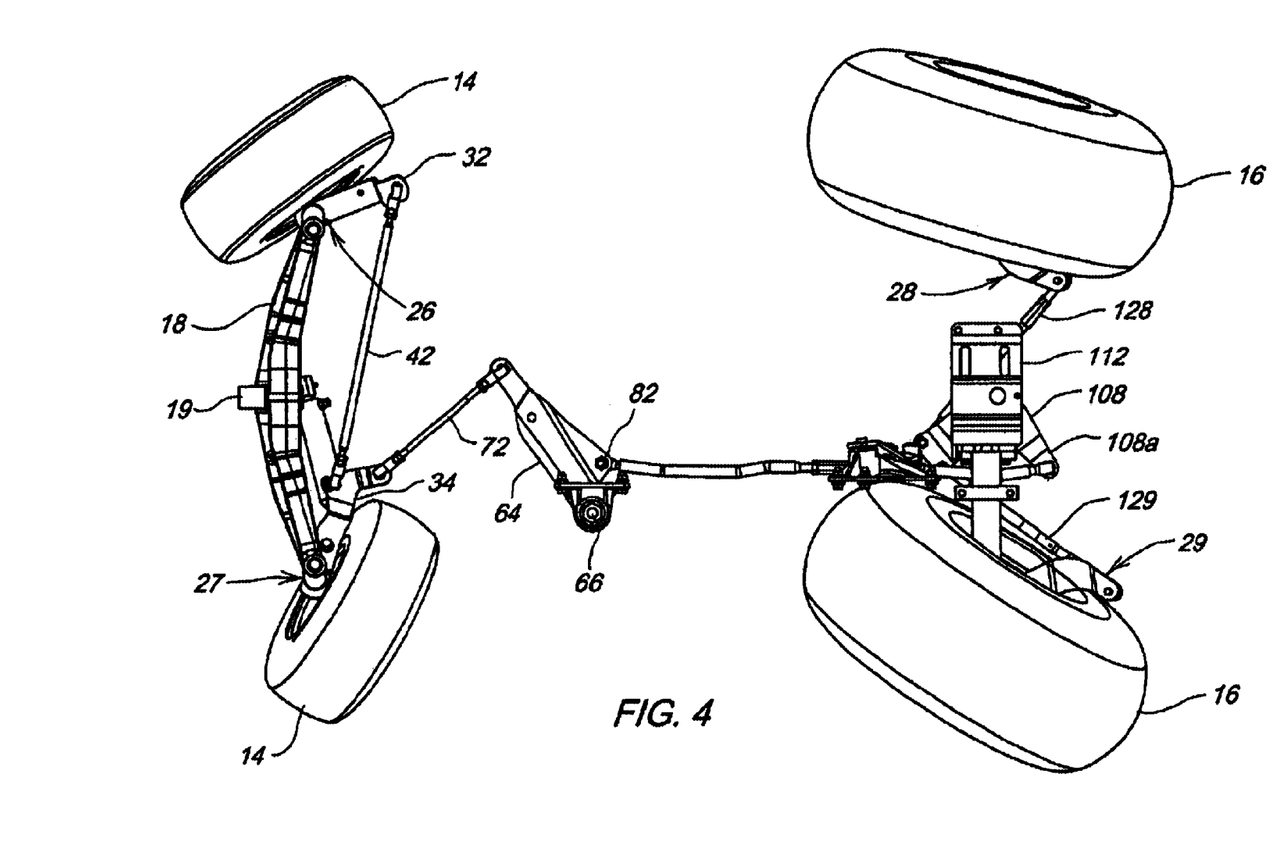
FIG. 4 is a plan view of a four-wheel steering system of FIG. 2 executing a left turn.
Figure 5:
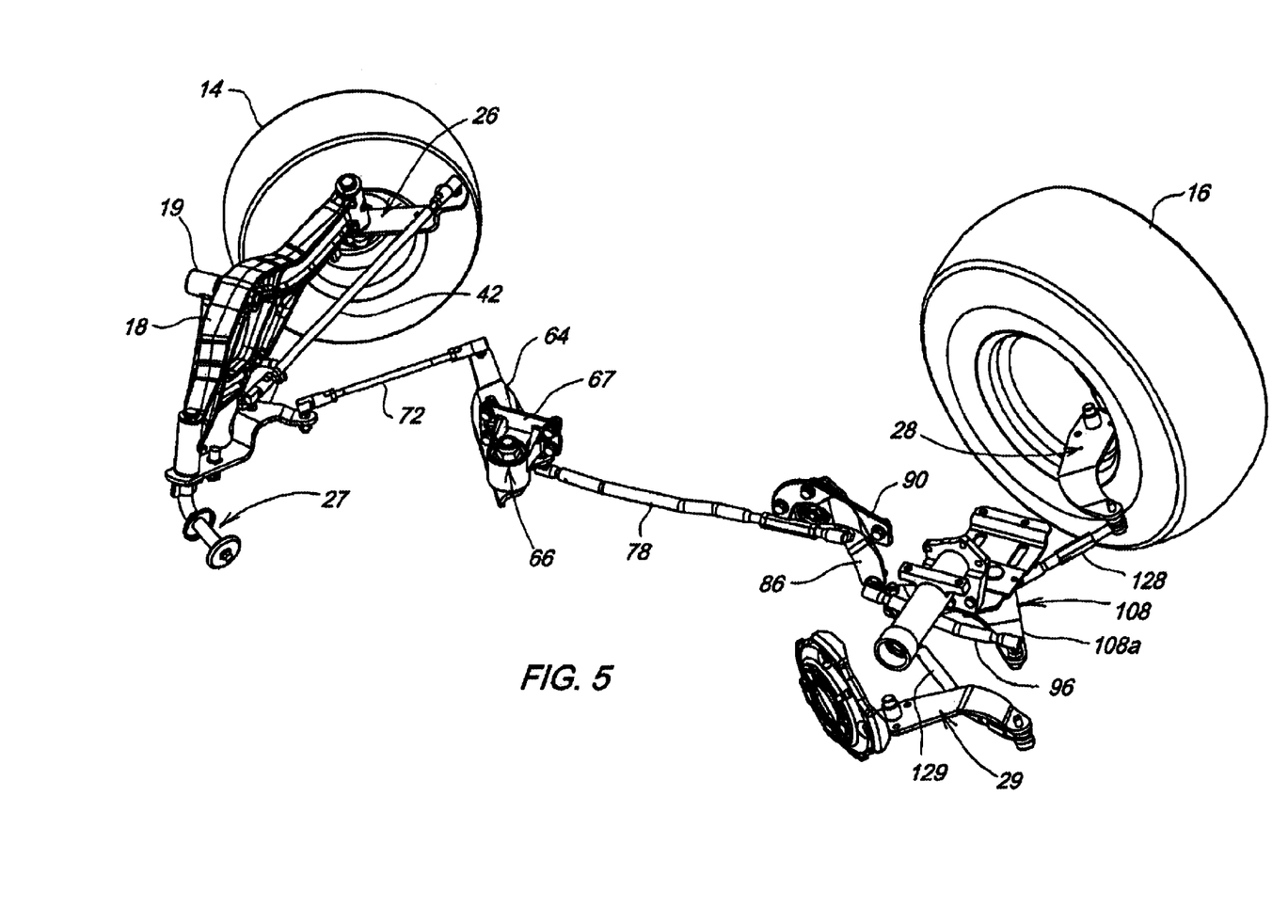
FIG. 5 is a fragmentary, perspective view of the four-wheel steering system shown in FIG. 4.

FIGS. 4, 5 and 6 illustrate the steering system of FIGS. 2 and 3 after a left hand turn is undertaken. For clarity, the hydraulic cylinder 46 is not shown in FIGS. 4 and 5. The cylinder 46 has been contracted by an operator turning the steering wheel 17 counterclockwise. The contracted cylinder has caused the arm 34 to rotate counterclockwise about its turning axis, and by force from the tie rod 42, the arm 32 is rotated counterclockwise as well. The front intermediate link 72 has forced the intermediate pivot 64 to rotate clockwise about the pivot joint 66. The rod 78 is translated toward the rear. The lever 86 had pivoted to translate the rear intermediate link 96 toward the rear. The rear center-pivot 108 has been rotated counterclockwise which has pushed the tie rod 129 and pulled the tie rod 128, causing the clockwise rotation of the rear wheels 16.

In contrast, when the cylinder 46 is elongated by a right hand turn, by input from the steering wheel 17, the front wheels are turned clockwise and the rear wheels are turned counterclockwise.

The reverse rotation of front and rear wheel pairs allows for tight, small radius turning with reduced sliding at the rear wheels.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A four-wheel steering system for a utility vehicle, comprising:
    a frame;
    a pair of front pivotal wheel support assemblies carried by said frame and adapted to be pivotal about turning axes for steering;
    a pair of front wheels rotationally mounted to said pair of front pivotal wheel support assemblies;
    a pair of rear pivotal wheel support assemblies carried by said frame and adapted to be pivotal about turning axes for steering;
    a pair of rear wheels rotationally mounted to said pair of rear pivotal wheel support assemblies;
    a front axle tie rod pivotally connected at opposite ends thereof to each of said front pivotal wheel support assemblies at a radial distance from its respective turning axis;
    a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;
    a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies, wherein said linkage assembly includes a longitudinal rod operatively connected between said front pivotal wheel support assemblies and said rear pivotal wheel support assemblies, pivoting of said front pivotal wheel support assemblies causing a longitudinal shifting of said longitudinal rod which in turn causes pivoting of said rear pivotal wheel support assemblies.

2. The system according to claim 1, wherein said hydraulic cylinder and said linkage assembly are both connected to a same front steering arm.

3. A four-wheel steering system for a utility vehicle, comprising:
    a frame;
    a pair of front pivotal wheel support assemblies carried by said frame and adapted to be pivotal about turning axes for steering;
    a pair of front wheels rotationally mounted to said pair of front pivotal wheel support assemblies;
    a pair of rear pivotal wheel support assemblies carried by said frame and adapted to be pivotal about turning axes for steering;
    a pair of rear wheels rotationally mounted to said pair of rear pivotal wheel support assemblies;
    a front axle tie rod pivotally connected at opposite ends thereof to each of said front pivotal wheel support assemblies at a radial distance from its respective turning axis;
    a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;
    a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies;
    wherein each of said front pivotal wheel support assemblies includes a front steering arm extending radially from its respective turning axis; and
    each of said rear pivotal wheel support assemblies including a rear steering arm extending radially from its respective turning axis;
    and wherein said linkage assembly comprises:
        a front intermediate pivot mounted to said frame for rotation about a first pivot joint;
        a front intermediate link pivotally connected at opposite ends thereof to said one front steering arm and to a second pivot joint on said front intermediate pivot at a distance from said first pivot joint;
        a longitudinal rod pivotally connected to said front intermediate pivot at a distance from both said first and second pivot joints;
        a rear pivot member pivotally mounted to said frame at a third pivot joint, said longitudinal rod operatively connected to said rear pivot member at a fourth pivot joint spaced from said third pivot joint;
        first and second rear tie rods, each connected at its respective first end to said rear pivot member and at its respective second end to a respective rear steering arm.

4. The system according to claim 3, comprising a lever pivotally mounted at a fourth pivot joint to said frame, said longitudinal rod pivotally connected to said lever at a fifth pivot joint located at a distance from said fourth pivot joint; and
    a rear intermediate link pivotally connected at a sixth pivot joint located on a side of said fifth pivot joint opposite said fourth pivot joint.

5. The system according to claim 4, wherein said lever is pivoted in a substantially vertical plane.

6. The system according to claim 3, wherein said front intermediate pivot is swung in a substantially horizontal plane.

7. The system according to claim 3, wherein said front axle tie rod is connected between said front steering arms, and said hydraulic cylinder is connected to one of said front steering arms.

8. A four-wheel steering system for a utility vehicle, comprising:
    a frame;
    a pair of front pivotal wheel support assemblies carried by said frame and adapted to be pivotal about turning axes for steering;

a pair of front wheels rotationally mounted to said pair of front pivotal wheel support assemblies;

a pair of rear pivotal wheel support assemblies carried by said frame and adapted to be pivotal about turning axes for steering;

a pair of rear wheels rotationally mounted to said pair of rear pivotal wheel support assemblies;

a front axle tie rod pivotally connected at opposite ends thereof to each of said front pivotal wheel support assemblies at a radial distance from its respective turning axis;

a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;

a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies;

wherein each of said front pivotal wheel support assemblies includes a front steering arm extending radially from its respective turning axis; and wherein said hydraulic cylinder and said linkage assembly are both connected to a same front steering arm.

9. A four-wheel steering system for a utility vehicle, comprising:

a frame;

a pair of front pivotal wheel support assemblies carried by said frame and adapted to be pivotal about turning axes for steering;

a pair of front wheels rotationally mounted to said pair of front pivotal wheel support assemblies;

a pair of rear pivotal wheel support assemblies carried by said frame and adapted to be pivotal about turning axes for steering;

a pair of rear wheels rotationally mounted to said pair of rear pivotal wheel support assemblies;

a front axle tie rod pivotally connected at opposite ends thereof to each of said front pivotal wheel support assemblies at a radial distance from its respective turning axis;

a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;

a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies;

wherein each of said front pivotal wheel support assemblies includes a front steering arm extending radially from its respective turning axis; and wherein said linkage assembly is connected to one of the front steering arms, and said one front steering arm that is connected to said linkage assembly extends from its respective turning axis by a length greater than a respective other front steering arm.

10. A four-wheel steering system for a utility vehicle, comprising:

a frame;

an axle pivotally mounted to said frame;

a pair of front pivotal wheel support assemblies mounted to said axle to be pivotal about turning axes for steering, each of said front pivotal wheel support assemblies includes a front steering arm extending radially from its respective turning axis;

a pair of front wheels rotationally mounted to said pair of front pivotal wheel support assemblies;

a pair of rear pivotal wheel support assemblies mounted to said frame to be pivotal about turning axes for steering, each of said rear pivotal wheel support assemblies including a rear steering arm extending radially from its respective turning axis;

a pair of rear wheels rotationally mounted to said pair of rear pivotal wheel support assemblies, a tie rod pivotally connected at opposite ends thereof to each of said front steering arms at a radial distance from the respective turning axis of each front pivotal wheel support assembly;

a hydraulic cylinder connected at opposite ends thereof to said axle and to one of said front steering arms at a radial distance from the respective turning axis of said one front pivotal wheel support assembly, and operable to expand and contract to pivot said one front pivotal wheel support assembly;

a linkage assembly operatively connected between one of said front steering arms and one of said rear steering arms to transform pivoting motion of said front steering arms to pivoting motion of said rear steering arms in a direction opposite to the pivoting motion of said front steering arms.

11. The system according to claim 10, wherein said linkage assembly comprises:

a front intermediate pivot mounted to said frame for rotation about a first pivot joint;

a front intermediate link pivotally connected at opposite ends thereof to said one front steering arm and to a second pivot joint on said front intermediate pivot at a distance from said first pivot joint;

a longitudinal rod pivotally connected to said front intermediate pivot at a distance from both said first and second pivot joints;

a rear pivot member pivotally mounted to said frame at a third pivot joint, said longitudinal rod operatively connected to said rear pivot member at a fourth pivot joint spaced from said third pivot joint;

first and second rear tie rods, each connected at its respective first end to said rear pivot member and at its respective second end to a respective rear steering arm.

12. The system according to claim 11, comprising a lever pivotally mounted at a fourth pivot joint to said frame, said longitudinal rod pivotally connected to said lever at a fifth pivot joint located at a distance from said fourth pivot joint; and a rear intermediate link pivotally connected at a sixth pivot joint located on a side of said fifth pivot joint opposite said fourth pivot joint.

13. The system according to claim 12, wherein said lever is pivoted in a substantially vertical plane.

14. The system according to claim 11, wherein said front intermediate pivot is swung in a substantially horizontal plane.

15. The system according to claim 10, wherein said linkage assembly is connected to one of the front steering arms, and said one front steering arm that is connected to said linkage assembly extends from its respective turning axis by a length greater than a respective other front steering arm.

16. A four-wheel steering system for a utility vehicle, comprising:
   a frame;
   a pair of front pivotal wheel support assemblies carried by said frame and adapted to be pivotal about turning axes for steering;
   a pair of front wheels rotationally mounted to said pair of front pivotal wheel support assemblies;
   a pair of rear pivotal wheel support assemblies carried by said frame and adapted to be pivotal about turning axes for steering;
   a pair of rear wheels rotationally mounted to said pair of rear pivotal wheel support assemblies;
   a front axle tie rod pivotally connected at opposite ends thereof to each of said front pivotal wheel support assemblies at a radial distance from its respective turning axis;
   a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;
   a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies;
   wherein each of said front pivotal wheel support assemblies includes a front steering arm extending radially from its respective turning axis; and
   each of said rear pivotal wheel support assemblies including a rear steering arm extending radially from its respective turning axis; and wherein
   said tie rod is connected between said front steering arms, and said hydraulic cylinder is connected to one of said front steering arms, and said linkage assembly is operationally connected between one of said front steering arms and said rear steering arms.

17. A four-wheel steering system for a utility vehicle, comprising:
   a frame;
   a pair of front pivotal wheel support assemblies carried by said frame and adapted to be pivotal about turning axes for steering;
   a pair of front wheels rotationally mounted to said pair of front pivotal wheel support assemblies;
   a pair of rear pivotal wheel support assemblies carried by said frame and adapted to be pivotal about turning axes for steering;
   a pair of rear wheels rotationally mounted to said pair of rear pivotal wheel support assemblies;
   a front axle tie rod pivotally connected at opposite ends thereof to each of said front pivotal wheel support assemblies at a radial distance from its respective turning axis;
   a hydraulic cylinder operatively connected at opposite ends thereof between said frame and one of said front pivotal wheel support assemblies at a radial distance from its respective turning axis, and operable to expand and contract to pivot said one front pivotal wheel support assembly with respect to said frame;
   a linkage assembly operatively connected between one of said front pivotal wheel support assemblies and said rear pivotal wheel support assemblies to transform pivoting motion of said front pivotal wheel support assemblies to pivoting motion of said rear pivotal wheel support assemblies in a direction opposite to the pivoting motion of said front pivotal wheel support assemblies; and
   an axle pivotally mounted about a substantially horizontal axis to said frame, said front pivotal wheel support assemblies pivotally mounted to said axle, and said hydraulic cylinder being operatively connected to said frame at one of said opposite ends thereof by being connected at one end to said axle.

* * * * *